United States Patent [19]

Merkle et al.

[11] Patent Number: 5,357,540
[45] Date of Patent: Oct. 18, 1994

[54] HIGH TEMPERATURE INDUSTRIAL FURNACE ROOF STRUCTURE

[75] Inventors: Frank P. Merkle, Hanover; Larry L. Horn, Galena; Barry R. James, Apple River, all of Ill.

[73] Assignee: Merkle Engineers Inc., Galena, Ill.

[21] Appl. No.: 937,607

[22] Filed: Aug. 28, 1992

[51] Int. Cl.⁵ .............................................. F27D 1/02
[52] U.S. Cl. .......................................... 373/73; 373/71; 110/332
[58] Field of Search .......................... 373/71, 72, 73; 110/331, 332, 335–338, 339; 428/238, 247, 251, 252

[56] References Cited

U.S. PATENT DOCUMENTS

| | | | |
|---|---|---|---|
| 3,056,362 | 10/1962 | Hosbein et al. | 110/331 |
| 3,568,611 | 3/1971 | Konrad | 110/331 |
| 3,789,780 | 2/1974 | Longenecker | 432/247 |
| 3,802,833 | 4/1974 | Weber | 432/251 |
| 3,824,936 | 7/1974 | Merkle, Jr. | 110/331 |
| 3,825,409 | 7/1974 | Longenecker | 432/250 |
| 3,958,519 | 5/1976 | Merkle, Jr. | 110/331 |
| 4,317,418 | 3/1982 | Courshon et al. | 110/331 |
| 4,424,756 | 1/1984 | Merkle | 110/332 |
| 4,453,352 | 6/1984 | Allen et al. | 110/338 |
| 4,475,470 | 10/1984 | Merkle | 110/332 |

Primary Examiner—Teresa J. Walberg
Assistant Examiner—Tu Hoang
Attorney, Agent, or Firm—Speckman, Pauley & Fejer

[57] ABSTRACT

A refractory brick for high temperature industrial furnace roof construction which accommodates hanger attachment at a plurality of locations along the length of the hanger brick. A high temperature industrial roof system having alternate rows of hanger bricks, of the above configuration, and filler bricks which are at least 2½ times as wide as the hanger bricks and can be individually removed by lifting from the top of the furnace. The high temperature industrial furnace roof may be constructed of two configurations of refractories with shortening of the length of either configuration of refractory to accommodate designs having a wide variety of roof widths. Electrically heated furnaces have bus bars which run along the length of the furnace and are fed through the top of the furnace.

20 Claims, 4 Drawing Sheets

HIGH TEMPERATURE INDUSTRIAL FURNACE ROOF STRUCTURE

BACKGROUND OF THE INVENTION

1. Field of the Invention

This invention relates to high temperature industrial roof structures, particularly to tin bath roof structures as are used in furnaces for the production of sheet glass. The roof structure of this invention uses hanger bricks which may be hung by metallic hangers from a support structure with the metallic hanger attachable at several locations on the hanger brick permitting design to a wide variety of roof widths and oversize hanger bricks and filler bricks to be cut on the job site for adjustment to exact roof widths. The roof structure of this invention may be constructed to a wide variety of dimensions using a single style of hanger brick and a single style of filler brick.

2. Description of Related Art

High temperature industrial furnaces require interior structures of heat-resistant refractory bricks or tiles. Such interior structures are heavy and require support from a substantial support frame which is constructed of structural steel. The roof support frame is usually constructed of large I beams or wide flange beams with rods suspending metallic hangers from which hanger bricks are suspended. Spaced rows of hanger bricks are suspended from the roof support frame and rows of filler bricks are placed in the space between adjacent rows of hanger bricks and supported on opposite sides by the adjacent hanger bricks. Hanger bricks presently used for tin bath roofs are shaped so that a hanger may be placed only at the end of the hanger brick, conventionally a single hanger supports the ends of two adjacent end-to-end hanger bricks. Present roof structures frequently require as many as 8 to 12 different styles of hanger bricks and as many as 8 to 12 different styles of filler bricks, necessitating that many different molds with manufacture of that many styles of brick together and supply of that many styles of brick to the job site, to accommodate varying roof dimensions.

SUMMARY OF THE INVENTION

It is an object of this invention to provide a high temperature refractory brick roof structure which utilizes one style of hanger brick and one style of filler brick which may be used in the design of a wide variety of roof dimensions.

Another object of this invention is to provide a high temperature refractory brick roof structure which permits provision of sections or bays of a wide variety of lengths.

Still another object of this invention is to provide a refractory brick roof structure for electrically heated furnaces in which the electrical bus bars are oriented in the longitudinal direction of the roof with their leads passing through the top of the furnace casing, thereby reducing wiring length and providing greater access to the cold or upper side of the roof bricks.

Yet another object of this invention is to provide a hanger brick which may be attached to a metallic hanger at several locations along the length of the brick, thereby allowing use of the same style hanger brick for designs readily accommodating various furnace widths and allowing oversize end hanger bricks to be cut at the job site for exact fitting.

Still another object of this invention is to provide a high temperature refractory brick roof structure in which the width of the filler bricks is at least two and a half times the width of the hanger bricks.

The above objects and other advantages which will become apparent upon reading the following description and preferred embodiments are achieved by use of a hanger brick having a flat generally rectangular lower face which is at least about two and a half times as long as it is wide, the lower face portion of the brick has a filler brick support ledge extending outwardly for the full length of the brick along opposite sides for a sufficient height and outward distance to support adjacent filler bricks. The narrower upper hanger portion of the brick has a hanger recess for the full length of the brick along opposite sides to provide bearing for a hanger suspending the hanger brick. The upper hanger portion of the brick, above the hanger recess, has a plurality of spaced generally laterally extending lugs providing a plurality of hanger attachment positions along the hanger portion of this hanger brick. One end of the hanger brick has an extending ridge and the opposite end has a recess sized to accept the corresponding extending ridge on the end of an adjacent hanger brick.

Filler bricks used in the high temperature furnace roof structure according to this invention have a flat generally rectangular lower face which in width is at least about two and a half times as wide as a hanger brick. The length of the filler brick is not critical, but is generally about 60 to about 80 percent the length of the hanger brick so that the end joints do not match. The filler bricks have generally flat end faces and the lower face portion on opposite sides has a recess to match the outwardly extending filler brick support ledge, by which a row of filler bricks are supported on opposite sides between rows of hanger bricks. This design of filler brick allows each filler brick to be removed by lifting upwardly. The roof design of this invention considerably reduces joint lengths in the furnace roof, since presently used filler bricks are about the same width as the hanger bricks, and increases accessibility to the cold side of the bricks for repair and placement, since considerably fewer hangers are required for a given area.

Sub-assemblies, or bays, along the length of the furnace may be made a variety of lengths using the single style hanger brick and single style filler brick of this invention. The width of the bricks may be made in metric dimensions to accommodate metric dimensions for the furnace length. Likewise, the roof structure of this invention may be readily designed to various roof width dimensions by use of shorter end bricks which may continue to be supported by hangers in the same fashion as the rest of the roof, since the hanger may be placed at a plurality of locations along the length of the hanger brick. Previously, special hanger bricks had to be designed and manufactured for the end positions for each different width furnace.

Electrically heated tin bath furnace roofs of this invention have electrical bus bars which extend lengthwise of the roof and are fed through the top of the furnace casing requiring less length wire leads and avoiding obstructions at the side of the furnace, as compared to present tin bath roofs in which electrical bus bars generally extend across the width of the roof and are fed through the side or top of the furnace casing.

BRIEF DESCRIPTION OF THE DRAWING

Further features of this invention will be apparent from the following detailed description of the invention read in conjunction with the drawing, wherein.

DESCRIPTION OF PREFERRED EMBODIMENTS

Figure 3:
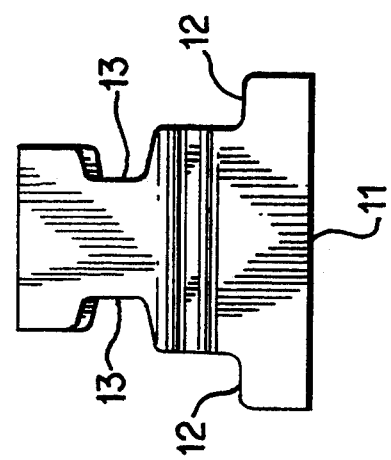
FIG. 3 is an end view of the hanger brick shown in FIG. 1
Figure 1:
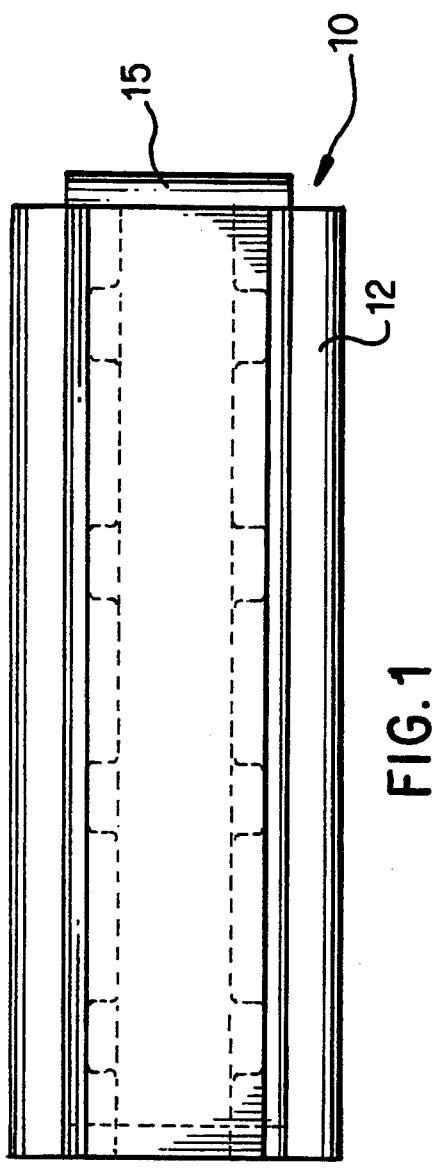
FIG. 1 is a top view of a hanger brick according to one embodiment of this invention.
Figure 2:
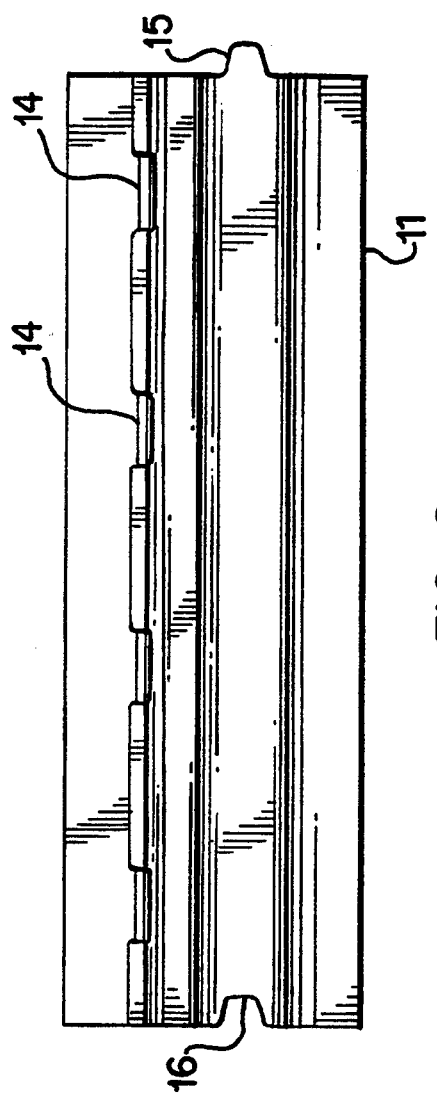
FIG. 2 is a side view of the hanger brick shown in FIG. 1

A hanger brick of this invention shown as 10 in FIGS. 1–3, has flat generally rectangular lower face 11 which is a least about 2½ times as long as it is wide, generally about 2½ to about 3½ times as long as it is wide. The longer hanger brick reduces the number of metallic hangers required which thereby provides more open space above the furnace roof. The lower face portion of hanger brick 10 has filler brick support ledge 12 extending outwardly for the full length of the brick along opposite sides. Filler brick support ledge 12 extends above lower face 11 for a sufficient height and outwardly for a sufficient distance to provide strength for support of adjacent filler bricks. The upper narrower hanger portion of hanger brick 10 has hanger recess 13 on each side extending for the full length of the brick and sufficiently deep to provide bearing for a hanger suspending the hanger brick. Above hanger recess 13 are a plurality of spaced generally laterally extending lugs 14 to retain the metallic hanger in a fixed location on the hanger brick and to provide a plurality of metallic hanger positions along the length of the hanger portion of the hanger brick. Generally, it is desired that lugs 14 be spaced a half of a hanger length from each end so that a hanger may be located at each end of the hanger brick to overlap on to an adjacent hanger brick and then spaced at hanger lengths along the length of the brick to allow hangers to be spaced along the top of the brick to accommodate a variety of furnace widths, as will be explained in further detail. Generally about 3 to about 6 lugs are used to provide 4 to 7 metallic hanger positions, 4 lugs are preferred providing 5 hanger positions. Lugs 14 may be any width suitable to the above spacing and consistent with durability. One end of hanger brick 10 has extending ridge 15 and the opposite end has end recess 16 sized to accept the corresponding extending ridge 15 on the end of an adjacent hanger brick 10. End ridge 15 and mating end recess 16 preferably extend across the width of the hanger brick, but may extend for only a portion of the width and may be of any other shape which accommodates end-to-end mating of adjacent hanger bricks. Hanger bricks 10 may be fabricated from known refractory materials suitable for the particular purpose of the high temperature furnace roof.

Figure 4:
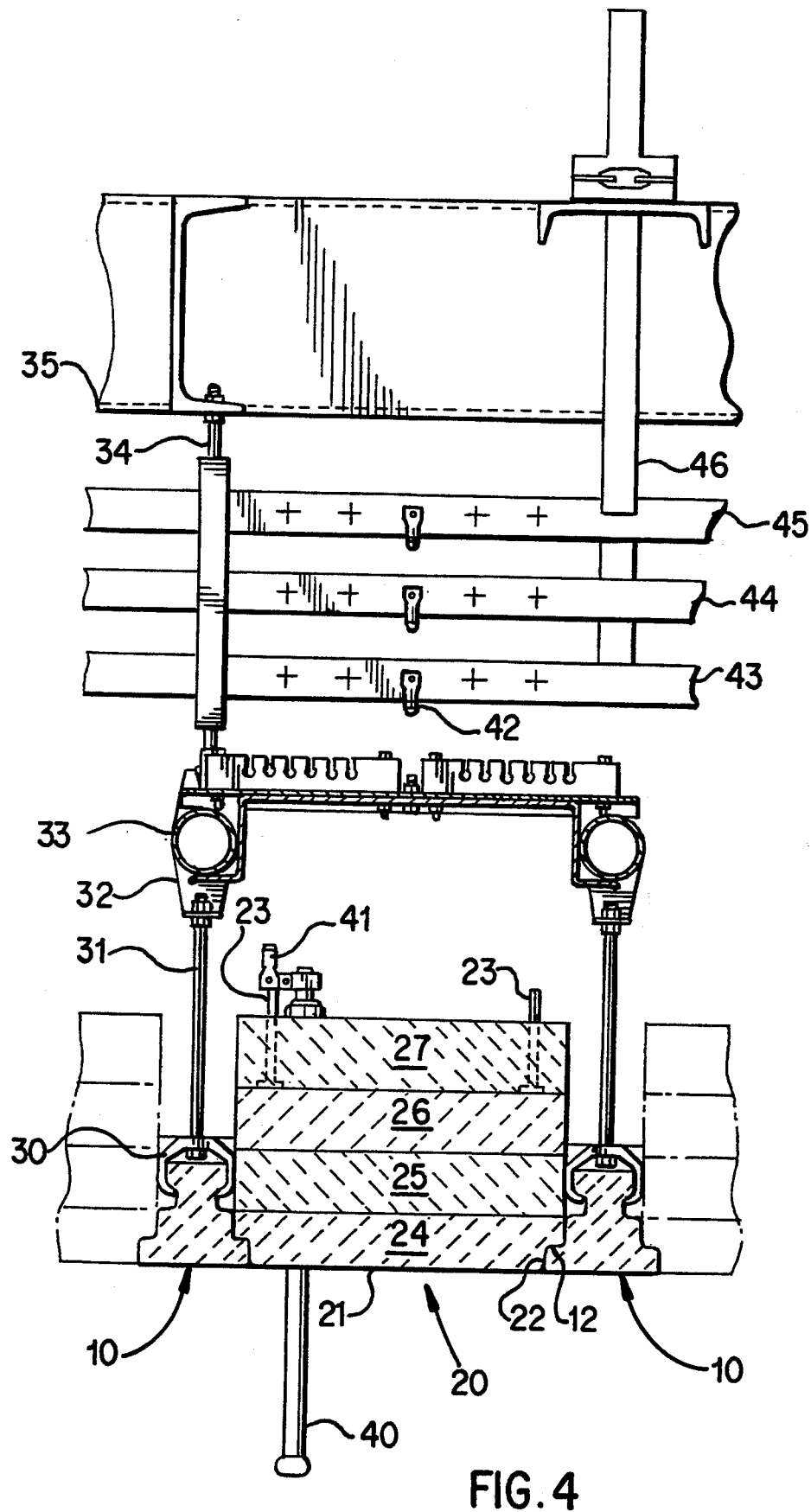
FIG. 4 is a cross section along the length of a furnace through a filler brick module showing longitudinal bus bars and casing top electrical entry.

A cross section along the length of a furnace through a filler brick module is shown in FIG. 4 with hanger bricks 10 supporting filler brick 20. Hanger brick 10 is suspended by metallic hanger casting 30 which is suspended by hanger rod 31 and hanger pipe clamp 32 from hanger pipe 33. Hanger pipe 33 is suspended by suspension rod 34 from roof support frame 35. The double suspension system used in the roofs of this invention provides flexibility in hanger brick suspension and decreases obstacles in the space between the upper side of the furnace roof and the furnace casing.

Filler brick 20 has flat generally rectangular lower face 21 which is at least two and a half times as wide as hanger brick lower face 11, as shown in FIG. 4. The filler bricks are as wide as is consistent with required strength which, again, reduces the number of metallic hangers required to suspend the roof structure. The filler bricks are shorter in length than the hanger bricks to stagger the joints along the length of the furnace roof providing greater stability. Generally, the hanger bricks are about 60 to about 80 percent as long as the hanger bricks. Filler brick 20 has generally flat end faces and side faces with the lower face portion on opposite sides having recess 22 to mate with filler brick support ledge 12. As seen in FIG. 4, the joints between the bricks are tight and no mortar is used in the joints. This configuration of filler brick 20 allows each filler brick to be removed by lifting upwardly using lifting hooks 23. Filler bricks may be fabricated from refractory materials having lesser heat resistance from the hot or inner face of the filler brick to the cold or outer face of the filler brick, as shown by numerals 24, 25, 26, and 27 in FIG. 4. Refractory layer 24 has sufficient heat resistance to withstand the temperatures of the furnace, while layers 25 through 27 may have somewhat less heat resistance. Suitable refractory materials are well known to one skilled in the art. These refractory layers may be assembled using adhesives. Insulation materials may be placed on top of both the hanger bricks and the filler bricks to provide a flat top surface which may be easily cleaned. The filler bricks used in the roof construction of this invention are significantly wider than previously used filler bricks which considerably reduces joint lengths in the furnace roof and reduces the number of hanger bricks and hangers required in the roof construction. The wider filler bricks used in the roof construction of this invention significantly reduces the number of hangers required to suspend the hanger bricks and thereby reduces erection costs and increases accessibility to the space above the furnace roof for maintenance. The filler bricks may have holes to accommodate heating elements 40, as desired to meet to heating requirements of the furnace.

Figure 5:
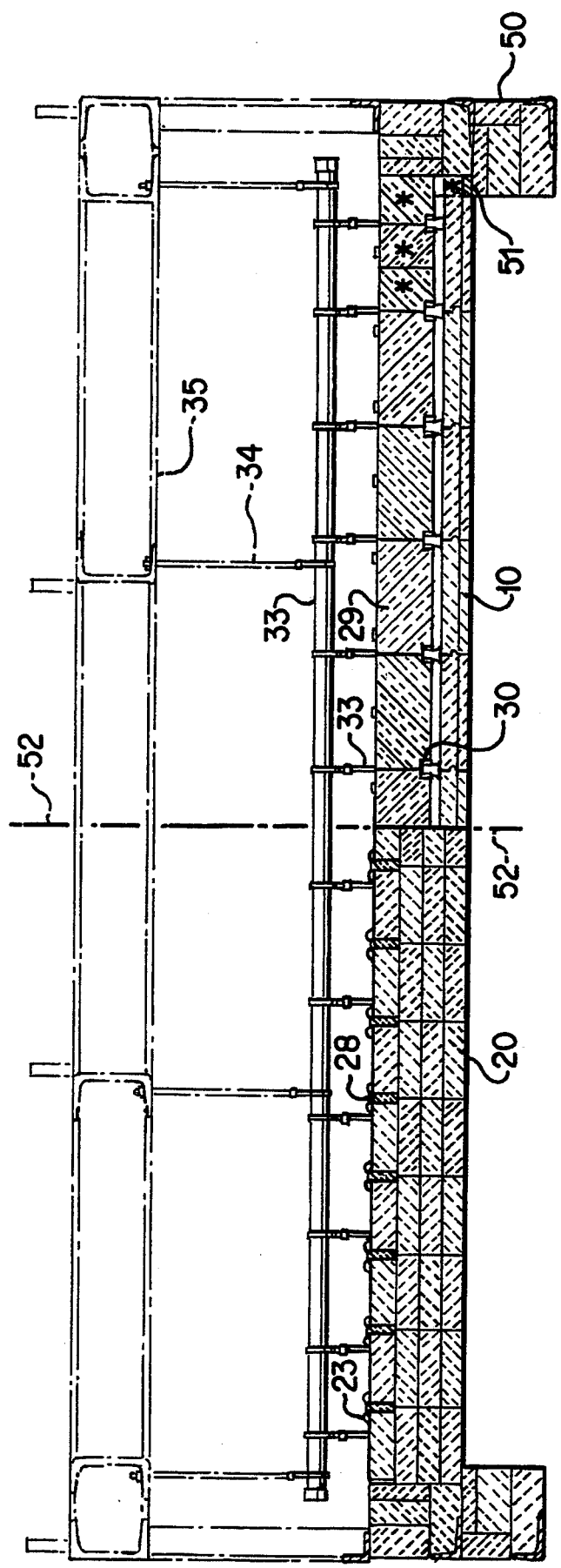
FIG. 5 is a split cross section along the width of a furnace, the left half through filler bricks and the right half through hanger bricks.

FIG. 5, shows a split cross section across the width of a furnace, with the furnace center line shown as 52. Typically in a tin bath roof, this distance may be in the order of about 15 feet while the length of a typical tin bath roof is in the order of 130 feet. The right half of FIG. 5 is a simplified schematic showing through hanger bricks and the left half is a schematic showing through filler bricks, without any electrical service shown. Furnace side walls 50 have a ledge 51 upon which the end roof refractories rest, the roof structure being suspended from roof support frame 35 by suspension rods 34 suspending hanger pipes 33 which in turn hold hanger rods 31 which suspend hanger bricks 10 by metallic hangers 30. Insulation 29 is shown above hanger bricks 10. At the right side wall 50 with ledge 51, it is seen that one hanger brick 10 has been reduced in length to fit the width of the furnace and the first hanger has been moved to a central hanger position on the adjacent hanger brick. In this manner, simply by reducing the length of the end hanger brick, adjusting the end metallic hanger to a desired inner position, and cutting insulation pieces to fit these modifications, the row of hanger bricks 10 can be fit to any furnace width using a single style hanger brick. The only components modified are indicated by an asterisk. Since the filler bricks 20 have flat sides except for recesses 22 which mate with support ledges 12, the end filler bricks can be reduced in length to fit the desired furnace width using a single style filler brick. As shown in the left side of FIG. 5, filler bricks 20 have their flat ends adjacent each other and are supported along each side, as shown in FIG. 4, by recess 22 mating with support ledge 12. Insulation strips 28 may be inserted between the top portions of the filler bricks.

The roof system of this invention allows assembly of roof sections, or bays, of desired dimensions along the length of the furnace. A section, or bay, may include any multiple of hanger brick-filler brick-hanger brick units as desired, since a row of filler bricks on each end of the section may be lifted out to allow removal of the section. Generally, the length of a bay is governed by the roof support structure and the furnace casing. Repair of the furnace roof is also facilitated by the roof system of this invention since any length of roof including at least one hanger brick-filler brick-hanger brick unit may be isolated for removal and replacement by removal of adjacent rows of filler bricks. The roof system of this invention may be erected using only two configurations of refractory bricks: a standard hanger brick which may be reduced in length to accommodate various furnace widths; and a standard filler brick which may be reduced in length to accommodate various furnace widths and may be provided with a hole for an electrical heating element. Thus, supply of bricks to the job site and their use by erectors is greatly simplified. Costs are considerably reduced by the requirement of only two basic molds in the fabrication of bricks for the roofs of this invention.

Electrical heating element 40 may be placed through filler brick 20 having a hole therefore, with cable connection 41 exterior to the top of the filler brick for attachment to a cable leading to cable connector 42 on one of longitudinal bus bars 43, 44, and 45, as shown in FIG. 4. Longitudinal bus bars 43, 44, and 45 are supplied by electrical supply strap 46 which exits through the top of the furnace casing, as shown in FIG. 4, for connection with an electrical supply source, not shown. Supply of electrical energy through the top of the furnace casing avoids wiring at the sides of the furnace eliminating electrical connections close to a plant traffic area. The longitudinal bus bars significantly reduce the number of obstructions above the refractory roof, affording better access to areas above the roof requiring maintenance.

Figure 6:
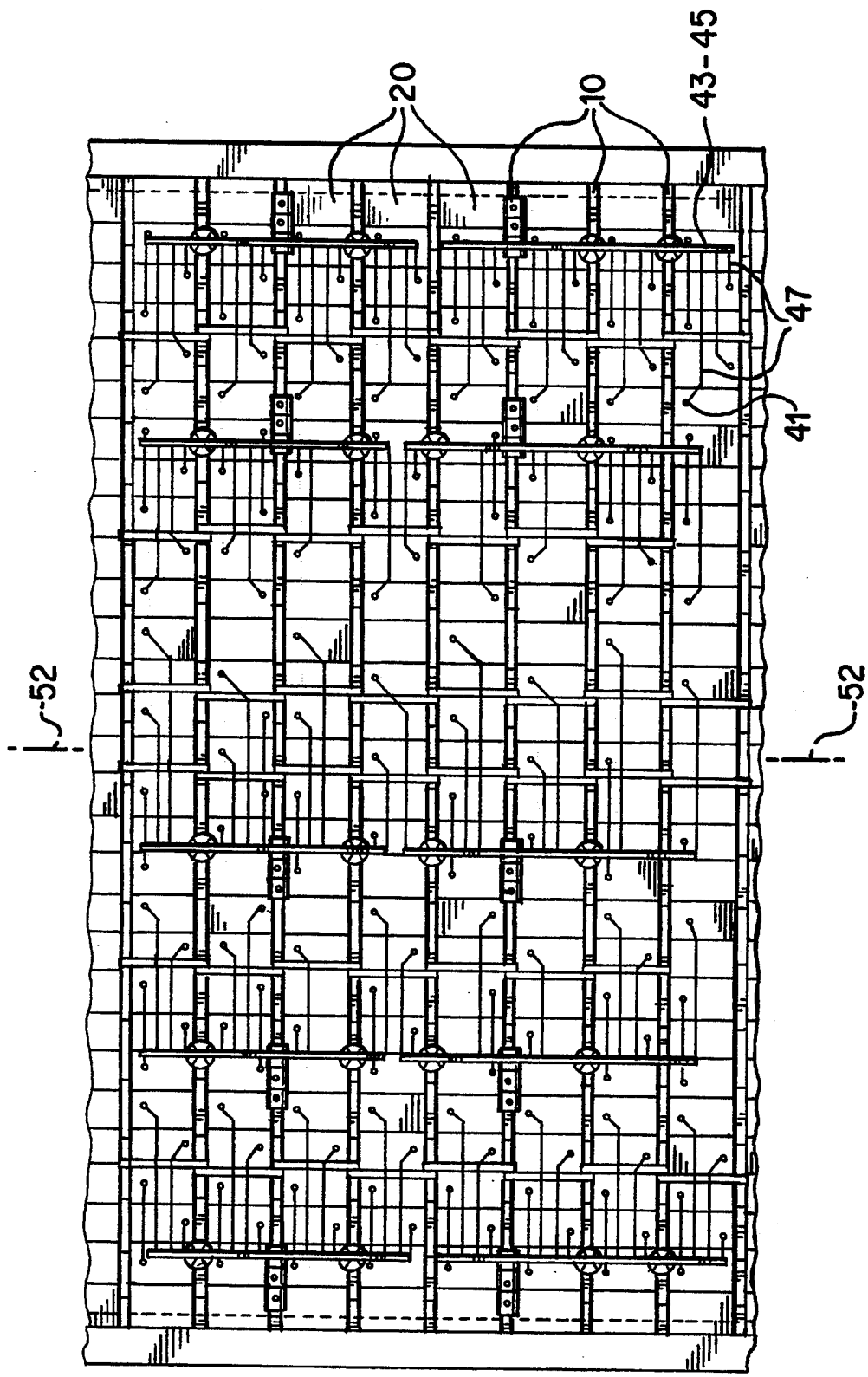
FIG. 6 is a top plan view showing hanger brick and filler brick placement and longitudinal bus bars with cable routing to element modules.

FIG. 6 is a typical top plan view of the full width of the furnace and a portion of its length, with centerline 52, showing rows of hanger bricks 10 and rows of filler bricks 20 extending in alternate fashion from one side to the opposite side of the furnace. Longitudinal bus bars 43–45 have attached cables 47 leading to cable connection 41 attached to heating element 40. Bus bars 43–45 may be of desired length to accommodate various desired roof section or bay lengths in the furnace. As seen in FIG. 6, the cable lengths are considerably reduced and the area above the roof left relatively uncluttered by running the bus bars along the length of the furnace, as compared with current practice of running bus bars across the width of the furnace.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from basic principles of the invention.

We claim:

1. A refractory hanger brick for high temperature industrial furnace roof construction, said hanger brick comprising: a lower face portion having a generally flat rectangular lower face with its length at least about $2\frac{1}{2}$ times its width, said lower face portion having an outwardly extending filler brick support ledge for said length of said hanger brick on opposite sides to provide support for adjacent filler bricks, an upper narrower hanger portion of said hanger brick having a hanger recess to provide bearing for a hanger suspending said hanger brick and extending on each side for said length of said hanger brick, a plurality of spaced generally laterally extending lugs above each said hanger recess to retain a hanger in fixed position and to provide a plurality of hanger positions along said length of said hanger brick, one end face of said hanger brick having an extending end ridge generally parallel to said lower face, and the opposite end face of said hanger brick having an end recess sized to mate with an end ridge of an adjacent hanger brick.

2. A refractory hanger brick according to claim 1 wherein said lower face has its length about $2\frac{1}{2}$ to about $3\frac{1}{2}$ times its width.

3. A refractory hanger brick according to claim 1 wherein one of said lugs is spaced a half of one said hanger position from each end of said hanger brick.

4. A refractory hanger brick according to claim 1 having 3 to 6 said lugs.

5. A refractory hanger brick according to claim 1 having 4 said lugs providing 5 hanger positions along said length of said hanger brick.

6. In a high temperature industrial furnace roof of the type having its length substantially greater than its width and comprising along said length of said roof alternate hanger brick rows extending across said width of said roof each comprising an end to end plurality of hanger bricks suspended from a roof support structure and filler brick rows extending across said width of said roof each comprising an end to end plurality of filler bricks supported by adjacent hanger bricks, the improvement comprising: a single configuration hanger brick comprising a lower face portion having a generally flat rectangular lower face with its length at least about $2\frac{1}{2}$ times its width, said lower face portion having an outwardly extending filler brick support ledge for said length of said hanger brick on opposite sides to provide support for adjacent filler bricks, an upper narrower hanger portion of said hanger brick having a hanger recess to provide bearing for a hanger suspending said hanger brick and extending for said length of the brick on each side, a plurality of spaced generally laterally extending lugs above each said hanger recess to retain a hanger in fixed position and to provide a plurality of hanger positions along said length of said hanger brick, one end face of said hanger brick having an extending end ridge generally parallel to said lower face, and the opposite end face of said hanger brick having an end recess sized to mate with an end ridge of an adjacent hanger brick, said generally flat rectangular lower face forming a portion of a flat inner face of said furnace roof.

7. In the high temperature industrial furnace roof according to claim 6, said improvement additionally comprising: a single configuration filler brick having a flat generally rectangular lower face which is at least two and a half times said width of said hanger brick lower face, generally flat end faces, and generally flat side faces with the lower portion of each side face having a recess mating with said filler brick support ledge on each side of said hanger brick thereby supporting said filler brick row.

8. In a high temperature industrial furnace roof according to claim 7 wherein said filler brick lower face is about 2½ to about 3½ times as wide as the width of said hanger brick lower face.

9. In the high temperature industrial furnace roof according to claim 6 wherein said hanger brick lower face has its length about 2½ to about 3½ times its width.

10. In the high temperature industrial furnace roof according to claim 6 wherein one of said lugs is spaced a half of one said hanger position from each end of said hanger brick.

11. In a high temperature industrial furnace roof according to claim 6 having 3 to 6 said lugs.

12. In a high temperature industrial furnace roof according to claim 6 having 4 said lugs providing 5 hanger positions along the length of said hanger brick.

13. In a high temperature industrial furnace roof according to claim 6 wherein the length of said filler bricks is about 60 to about 80 percent the length of said hanger bricks.

14. A high temperature industrial furnace roof system having its length substantially greater than its width and comprising: along the length of said roof alternate hanger brick rows and filler brick rows extending across said width of said roof; said hanger brick rows comprising an end to end plurality of single configuration hanger bricks, each said hanger brick having a lower face portion having a generally flat rectangular lower face with its length at least about 2½ times its width, said lower face portion having an outwardly extending filler brick support ledge for said length of said hanger brick on opposite sides to provide support for adjacent filer bricks, an upper narrower hanger portion of said hanger brick having a hanger recess to provide bearing for a hanger suspending said hanger brick and extending for said length of said hanger brick on each side, a plurality of spaced generally laterally extending lugs above each said hanger recess to retain a hanger in fixed position and to provide a plurality of hanger positions along said length of said hanger brick, one end of said hanger brick having an extending end ridge generally parallel to said lower face, and the opposite end of said hanger brick having an end recess sized to mate with an end ridge of an adjacent hanger brick; and said filler brick rows comprising an end to end plurality of single configuration filler bricks, each said filler brick having a generally flat rectangular lower face with a width at least two and a half times said width of said hanger brick lower face, generally flat end faces, and generally flat side faces with the lower portion of each said side face having a recess mating with said filler brick support ledge on each side of said hanger brick thereby supporting said filler brick row, said generally flat rectangular lower faces of said hanger bricks and said generally flat rectangular lower faces of said filler bricks forming a generally flat inner face of said furnace roof.

15. A high temperature industrial furnace roof system according to claim 14 wherein the end of each said hanger brick row additionally comprises one of said a hanger bricks which has been shortened in length to accommodate the width of said furnace.

16. A high temperature industrial furnace roof system according to claim 14 wherein the end of each said filler brick row additionally comprises one of said filler bricks which has been shortened in length to accommodate the width of said furnace.

17. A high temperature industrial furnace roof system according to claim 14 wherein each said hanger brick lower face has its length about 2½ times its width and each said filler brick lower face width is at least 2½ times said width of said hanger brick lower face.

18. A high temperature industrial furnace roof system according to claim 14 wherein a plurality of said filler bricks have a through hole containing an electrical heating element means having a wire lead attached to its end extending above said filler brick, the opposite end of said wire lead being attached to on of a plurality of electrical bus bars oriented parallel to said length of said furnace, said electrical bus bars being fed through a top casing of said furnace.

19. A high temperature industrial furnace roof system according to claim 14 wherein said filler bricks have a length about 60 to about 80 percent the length of said hanger bricks.

20. A high temperature industrial furnace roof system comprising alternate hanger brick rows of a single style hanger brick and filler brick rows of a single style filler brick, said hanger brick having a lower face portion having a generally flat rectangular lower face with its length at least about 2½ times its width, said lower face portion having an outwardly extending filler brick support ledge for said length of the brick on opposite sides to provide support for adjacent filler bricks, an upper narrower hanger portion of said brick having a hanger recess to provide bearing for a hanger suspending said brick and extending for said length of said brick on each side, a plurality of spaced generally laterally extending lugs above each said hanger recess to retain a hanger in fixed position and to provide a plurality of hanger positions along said length of said brick, one end of said brick having an extending end ridge generally parallel to said lower face, and the opposite end of said brick having an end recess sized to mate with an end ridge of an adjacent hanger brick; and said filler brick having a generally flat rectangular lower face with a width at least two and a half times said width of said hanger brick lower face, generally flat end faces, and generally flat side faces with the lower portion of each said side face having a recess mating with said filler brick support ledge on each side of said hanger brick for support of said filler brick, each said hanger brick suspended by a metallic hanger casting fitting in said hanger recess, said metallic hanger casting suspended by a hanger rod and hanger pipe clamp from a hanger pipe which is suspended by a suspension rod from a roof support frame.

* * * * *